United States Patent [19]

Hinsberg, III et al.

[11] Patent Number: 5,826,065

[45] Date of Patent: Oct. 20, 1998

[54] SOFTWARE ARCHITECTURE FOR STOCHASTIC SIMULATION OF NON-HOMOGENEOUS SYSTEMS

[75] Inventors: William Dinan Hinsberg, III; Frances Anne Houle, both of Fremont, Calif.

[73] Assignee: International Business Machines Corporation, Armonk, N.Y.

[21] Appl. No.: 782,164

[22] Filed: Jan. 13, 1997

[51] Int. Cl.$^6$ .................................................. G06F 9/455

[52] U.S. Cl. .................... 395/500; 395/701; 395/710; 364/578

[58] Field of Search .................... 395/500, 183.13, 395/701, 705, 710; 364/578, 140, 554, 580; 345/326, 335, 156

[56] References Cited

U.S. PATENT DOCUMENTS

| | | | |
|---|---|---|---|
| 3,702,009 | 10/1972 | Baldwin, Jr. | 444/1 |
| 4,219,877 | 8/1980 | Vladimirov et al. | 364/554 |

(List continued on next page.)

FOREIGN PATENT DOCUMENTS

| | | |
|---|---|---|
| 226964 | 11/1969 | U.S.S.R. . |
| 458839 | 3/1975 | U.S.S.R. . |
| 482733 | 12/1975 | U.S.S.R. . |
| 498622 | 8/1976 | U.S.S.R. . |
| 717776 | 2/1980 | U.S.S.R. . |
| 721814 | 3/1980 | U.S.S.R. . |
| 741297 | 6/1980 | U.S.S.R. . |
| 868771 | 9/1981 | U.S.S.R. . |
| 888115 | 12/1981 | U.S.S.R. . |
| 960833 | 9/1982 | U.S.S.R. . |
| 999063 | 2/1983 | U.S.S.R. . |
| 1062695 | 12/1983 | U.S.S.R. . |

OTHER PUBLICATIONS

P. J. Haas and G. S. Shedler, Simulation Algorithm for Passage Times in Colored Stochastic Petrinets, IBM TDB vol. 35, No. 1A, Jun. 1992, pp. 186–188.

C. Bianchi, G. Calzolari and P. Corsi, Stochastic Simulation: A Package for Monte Carlo Experiments on Econometric Models, IBM TDB vol. 20, No. 10, Mar. 1978, pp. 3972–3975.

K. A. Singmaster and F. A. Houle, Laser–Assisted Chemical Vapor Deposition from the Metal Hexacarbonyls, American Chemical Society, 203rd Nat. Meeting of American Chemical Society, San Francisco, CA Apr. 4–10, 1992, pp. 293–301.

(List continued on next page.)

*Primary Examiner*—Vincent N. Trans
*Assistant Examiner*—Thai Phan
*Attorney, Agent, or Firm*—Romualdas Strimaitis; James C. Pintner

[57] ABSTRACT

A stochastic simulation method and system are provided. The invention eliminates the need for the use of subroutine calls in a user-written simulation program, and of option flags to direct execution via decision trees, by allowing the user to configure the simulator through choices of options at run-time. The options are presented via a user interface as radio buttons or checkboxes which the user activates. The simulator sets itself up to incorporate only those options. The programmer (that is, the author of software according to the invention) only makes the objects available and ensures that they work together. It is the user who actually configures the simulator. The invention provides a highly extendable structure. By use of inheritance and dynamic allocation of memory, and by design of self-contained objects to represent various components of the simulation system, a simulation program according to the invention incorporates new features and options with a minimum of new code. This enables creation of a single simulation package that efficiently handles a wide variety of physical situations, useable for calculations as diverse as starved feed reactors, multi-compartment pharmacokinetics and heat flow, using single reaction volumes or multiply linked compartments. The efficiency is gained by minimizing the amount of memory required to run the program, and by eliminating repetitive and time-consuming progression through decision trees.

27 Claims, 9 Drawing Sheets

U.S. PATENT DOCUMENTS

| | | | |
|---|---|---|---|
| 4,383,757 | 5/1983 | Phillips | 355/53 |
| 4,513,384 | 4/1985 | Rosencwaig | 364/563 |
| 4,534,003 | 8/1985 | Manzione | 364/476 |
| 4,632,818 | 12/1986 | Chen et al. | 423/574 |
| 4,661,913 | 4/1987 | Wu et al. | 364/500 |
| 4,670,404 | 6/1987 | Swift et al. | 436/147 |
| 4,751,637 | 6/1988 | Catlin | 364/200 |
| 4,758,533 | 7/1988 | Magee et al. | 437/173 |
| 4,819,161 | 4/1989 | Konno et al. | 364/300 |
| 4,828,224 | 5/1989 | Crabb et al. | 251/298 |
| 4,834,866 | 5/1989 | Schmidt | 208/65 |
| 4,841,479 | 6/1989 | Tsuji et al. | 364/900 |
| 4,908,784 | 3/1990 | Box et al. | 364/569 |
| 4,933,883 | 6/1990 | Pennebaker et al. | 364/554 |
| 4,935,882 | 6/1990 | Pennebaker et al. | 364/554 |
| 4,965,743 | 10/1990 | Malin et al. | 364/513 |
| 4,967,014 | 10/1990 | Masamoto et al. | 568/458 |
| 4,985,860 | 1/1991 | Vlach | 364/578 |
| 4,988,166 | 1/1991 | Cook | 350/321 |
| 5,003,118 | 3/1991 | Low et al. | 585/253 |
| 5,019,998 | 5/1991 | Cowan et al. | 364/496 |
| 5,029,119 | 7/1991 | Konno | 364/578 |
| 5,079,731 | 1/1992 | Miller et al. | 364/578 |
| 5,081,601 | 1/1992 | Eirikasson | 364/578 |
| 5,157,620 | 10/1992 | Shaar | 364/578 |
| 5,202,843 | 4/1993 | Kunimine et al. | 364/578 |
| 5,360,534 | 11/1994 | Rice et al. | 208/139 |
| 5,362,917 | 11/1994 | Ogawa et al. | 568/454 |
| 5,442,569 | 8/1995 | Osano | 364/578 |
| 5,446,828 | 8/1995 | Woodall | 395/23 |
| 5,459,675 | 10/1995 | Gross et al. | 364/492 |
| 5,486,996 | 1/1996 | Samad et al. | 364/152 |
| 5,544,348 | 8/1996 | Umeda et al. | 395/500 |
| 5,652,871 | 7/1997 | Steinman et al. | 395/500 |

OTHER PUBLICATIONS

F. A. Houle & K. A. Singmaster, Visible Laser–Induced Nucleation and Growth of Cr, Mo, and W Films form the Hexacarbonyls. Reactivity of CO on Film Surfaces, Reprinted from the Journal of Physical Chemistry, 1992, 96, 10425–10439.

G. Arthur Mihram, Simulation Statistical Foundations and Methodology, vol. 92 in Mathematics in Science and Engineerieng pp. 228–230, 1972.

N. T. J. Bailey, The elements of Stochastic Processes with Applications to the Natural Science, Chapter 7, Markov Processes in Continuous Time, pp. 66–69.

S. J. Lombardo and A. T. Bell, A Review of Theoretical Models of Adsorption, Diffusion, Desorption, and Reaction of Gases on Metal Surfaces, Surface Science Reports 13 (1991) 1–72 North Holland.

Hinsberg and Houle, MSIMPC v2.0: An Interactive Discreter Chemical Mechanism Simulator for the IBM PC (Laboratory and Classroom Version) IBM Research Report, 7814 (72196 Nov. 8. 1990 Chemistry.

Bunker, Garrett, Kleindienst and Stevenson, Discrete Simulation Methods in Combustion Kinetics, Univ. of Calif. Irvine, Chemistry Dept. (paper) 1–20.

Bunker and Houle MSIM4—Discrete Simulator for Kinetic Mechanisms, Univ. of Calif. Irvine, Jul. 12, 1974 (paper) pp. 1–18.

Gillespie, Exact Stochastic Simulation of Coupled Chemical Reactions, Journal of Physical Chemistry, vol. 81, No. 25, 1977, pp. 2340–2361.

Gillespie, A General Method for Numerically Simulating the Stochastic Time Evolution of Coupled Chemical Reactions, Journal of Computational Physics vol. 22, No. 4, Dec. 1976, pp. 403–434.

Formosinho, Markov Chain Simulation of Chemical Reactions in Nonhomogeneous Systems, Journal of Chemical Education, vol. 59 No. 4, Apr. 1982.

Turner, Discrete Simulation Methods for Chemical Kinetics, Journal of Physical Chemistry, vol. 81, No. 25, 1977, pp. 2379–2408.

Breuer, Honerkamp and Petruccione, A Stochastic Approach to Complex Chemical Reactions, Chemical Physics Letters, vol. 190, No. 3,4, Mar. 6, 1992 pp.–199–201.

Bunker, Garrett, Kleindienst, Stevenson, Discrete Simulation Methods in Combustion Kinetics, Combustion Institute, Combustion and Flame 23, 373–379 (1974).

Meyerson, Scott and Tsui, Experimental and Chemical Kinetic Modelling Study of Silicon CVD from Monosilane and Disilane, Chemtronics, vol. 1, Dec. 1986.

Hicks, Urbach, Plummer Dai, Can Pulsed Laser Excitation of Surfaces Be Described by a Thermal Model, Physical Review Letter, vol. 61, No. 22, 28 Nov. 1988, pp. 2588–2591.

Liarokapis and Raptis, Temperature Rise Induced by a CW Laser Beam Revisted, J. Appl. Phys. 47 (12), 15 Jun. 1985, pp. 5123–5126.

Barbero, Banon, Benito Santamaria, Stochastic Simulation Methods for Pollution Kinetics, Univ. Complutense, Madrid–3, 1984.

DeVilbiss et al., "Data Management in the Joint Modeling and Simulation and Simulation system", IEEE, 1995, pp. 787–792.

Cornelio et al., "Extending Object–Oriented Concepts to Support Engineering Applications", IEEE, 1990, pp. 220–227.

Guariso et al., "Identification of Model Structure via Qualitive Simulation", 1992, pp. 1075–1086.

SOFTWARE ARCHITECTURE FOR STOCHASTIC SIMULATION OF NON-HOMOGENEOUS SYSTEMS

FIELD OF THE INVENTION

The invention generally relates to the field of stochastic simulation, that is, simulations in which a system being simulated is modeled in terms of a state, various reactions which change the state of the system, and occurrences of the reactions. The occurrences are given in terms of events at simulated times, the times being calculated in terms of probabilities of occurrence of the reactions, based on the current state of the system at that point in the simulation.

More particularly, the invention relates to an object-oriented architecture for stochastic simulation of chemical reactions and transport.

BACKGROUND OF THE INVENTION

Certain types of computer-implemented simulators, which simulate processes such as chemical reactions, have operated by solving differential reaction-rate equations. See, for instance, the introductory portion of Gillespie, "Exact Stochastic Simulation of Coupled Chemical Reactions," Journal of Physical Chemistry, vol. 81, page 2340 (1977).

CHEMKIN®, a software package from Sandia National Labs, is an integrator package which includes specific FORTRAN subroutines users can incorporate into their simulation programs.

Because such equations usually cannot be solved analytically, computerized numerical approximations have been used. However, such simulations are difficult to apply to complex systems. They are based on the not-always-realistic premises that the reactions are continuous and deterministic. Computerized numerical solutions of such differential reaction-rate equations are inherently based on a continuous time flow, rather than on discrete points in time.

Also, in the context of simulation through solution of such differential reaction rate equations, Gillespie describes "deterministic" as being an unrealistic condition, because molecular populations can only change by discrete integer amounts, and because the exact positions and velocities of the individual molecules, which must be taken into account for a fully deterministic analysis, are not available.

By contrast, stochastic simulators have been used to make discrete time simulations of chemical processes. Simulation using stochastic methods has had advantageous flexibility. In particular, stochastic simulators lend themselves well to realistic simulation of complex systems.

Stochastic simulators operate by tracing a set of individual events which may occur over a time period during which the process is to be simulated. Initially, for instance, it might be assumed that given populations of reactant atoms or molecules (generally referred to as "particles") are present, and that certain reactions between the reactants are possible. As the simulation proceeds, an "event" is an occurrence of one of the reactions. The populations of reactants, and populations of reaction products, changes, generally incrementally, as a result of that one occurrence of the reaction. Overall, the simulation is made up of a series of such events. Each event, or occurrence of one of the possible reactions, may be thought of as a step of the simulation.

The simulators operate in a stepwise fashion, in terms of an independent state variable. Because of requirements which follow from the physics of the systems being simulated, the independent state variable is usually time. The simulation operates over a given domain of values for the independent state variable, such as from an initial time to a conclusion time, or from an initial state at an initial time until a final state is reached, however long that takes.

The simulator makes a determination that each of the events has a certain probability of occurrence, which is determined by the system conditions and material properties, at any specific point of time. Typically, the probability is a function of the concentrations of the reactants, and of other factors such as temperature, pressure, etc.

It is well-known, to those skilled in the art of stochastic simulation of chemical processes, that there is a relation between (i) the probability of occurrence of a reaction in a simulation, and (ii) the reaction rate under the prevailing conditions in the simulation. Stochastic simulation methods commonly take, as a premise, that reaction probability and reaction rate are equivalent. Accordingly, while the terms are not synonymous, some prior art references have used them with some degree of interchangeability, without obscuring the meaning of the discussion.

For the purpose of the present invention, reaction probability and reaction rate are taken to be equivalent. However, in the present specification, a rigorous distinction will be made between "rate" and "probability," to explain clearly how each relates to the stochastic simulations being described.

In a predefined time-window or interval, which is commonly referred to as a "time step," any one of the simulated events may occur. There is, on the average, one occurrence of an event within a time step when the length of that time step is selected to be equivalent to the inverse of the total probability of occurrence of all events. In a stochastic simulation, one occurrence of one reaction takes place during that time step. Which of the possible reactions is to occur is selected at random, except weighted by the various probabilities of occurrence. Thus, the likelihood of occurrence of a particular one of the events within a given time step is proportional to the probability for that event.

A stochastic simulator is commonly implemented in software on at least one processor. The processor is programmed to define a time step, based on the sum total of the reaction rates for all of the reactions being simulated, and then to randomly select one of those reactions, for which there will be an event which is to take place in that time step. The likelihood of an event being randomly selected is proportional to the probability of occurrence of the selected event, relative to that of the other events.

As a consequence of the occurrence of the selected event, the processor updates the system conditions by use of material property tables, system process equations and other required data groups stored in at least one data storage apparatus. The system update may change the probabilities of occurrence of the events, resulting in a different total probability and a different time step. The processor then selects a new time step and repeats the event selection and system condition update processes, to propagate a system through the entire time span for system simulation.

It may be assumed, for some purposes, that all reactants are distributed evenly throughout a volume in which the simulation is taking place. A stochastic simulator was first used to simulate such a spatially homogeneous chemical system where many chemical reactions occur (D. L. Bunker et al., Combustion and Flame, vol. 23, p. 373, 1974).

The probability of an individual chemical reaction is dependent on the rate constants, and on the concentrations of a variety of chemical reactants. The functional dependence and the concentrations are stored in the storage apparatus. The processor generates a random number between 0 and 1 to select among various chemical reactions a specific reaction in each time step, thus allowing the simulation to propagate in time. The time base for determining the length of time step is based on the total sum of all reaction probabilities.

Additional pioneering work was done by Bunker and Houle in "User's Manual: MSIM4—Discrete Simulator for Kinetic Mechanisms," Univ. of California, Irvine, Jul. 12, 1974, and by Hinsberg and Houle in "MSIMPC v2.0: An Interactive Discrete Chemical Mechanism Simulator for the IBM PC (Laboratory and Classroom Version)," IBM RJ 7814 (Nov. 8, 1990), to implement a simulator similar to that of Bunker and Houle for the IBM Personal Computer.

Another chemical simulator has been developed by Gillespie wherein, for each stochastic time step, the simulator generates two random numbers, each between 0 and 1. The first random number is used for selecting a chemical reaction event which is to be simulated. The probabilities of all of the possible reactions are normalized from 0 to 1. Thus, the range from 0 to 1 is divided up into subintervals, each subinterval being assigned to one of the reactions, and having a size proportional to that reaction's probability. The first random number falls within the subinterval of one of the reactions. That reaction is selected as the event.

The second random number is used for properly weighting the time base used for time step determination. The reciprocal of the sum of the reaction rate, which is a time interval, is used to calculate a time step T for the simulation, using a formula such as $$\tau = \frac{-\ln R}{\sum_j rate_j} \quad (1)$$

where $rate_j$ is the reaction rate of the j-th reaction of the simulation, and R is the second random number between 0 and 1. It will be seen that, for such stochastic simulations, time steps need not be uniform in size, or predictable. (Gillespie, "A General Method for Numerically Simulating the Stochastic Time Evolution of Coupled Chemical Reactions," Journal of Computational Physics, Vol. 22, No. 4, pp. 403–434, 1976) . Better accuracy is achieved with this method than with Bunker's method, when fluctuating systems are involved.

Other conventional stochastic simulators have been employed for simulation purposes, such as U.S. Pat. No. 5,446,870, Hinsberg, III, et al., "Spatially Resolved Stochastic Simulation System, IBM Corporation's Chemical Kinetics Simulator™ chemical kinetics simulator product (hereinafter "CKS"), and a system described in P. Hanusse and A. Blanche, "A Monte Carlo method for large reaction-diffusion systems" J. Chem. Phys. 74(11), p 6148 (1981).

Although stochastic simulators are very powerful, prior art implementations have not been optimal. The software architectures used in such conventional simulators have been cumbersome, and have not been extendable so as to accommodate changing user requirements.

The idea, in the abstract, of allowing for extendibility by building in optional behavior in simulators is common in practice, but conventionally has been done by setting flags to access only certain parts of the code. That procedural approach has been impractical to use for more than 3–4 optional behaviors, particularly if the options are interdependent.

U.S. Pat. No. 5,446,870, discussed above, attempted to overcome some of the internal complexities of simulation programs which support a range of physical variables. Spatially resolved simulations are handled using complex materials compositions and state variables. The simulator is set up at run time by user selection of options, and by internal separation of data groups into information on geometric configuration, system state, materials properties, material-energy processes and probabilities of those processes. Data are linked by means of identifiers, reducing the complexity of the internal representation of the data for the simulation.

However, the simulator taught in the '870 patent did not realize the full benefit of its design, because it was based on procedural methods. As a consequence, all options supported by an implementation of that simulator have to be designed into it from the start, and it is difficult to later add something new. Finally, the use of decision trees makes execution inefficient.

The prior art simulators discussed above have, in common, a significant drawback which limits their ease and efficiency of use, and slows their performance. This drawback is the conventional nature of their software implementation. Here, "conventional" means that they are implemented using the technique of procedural programming. If special simulation options are incorporated, then they are implemented in the software as a series of flags with appropriate decision trees. The flags enable different routines, depending on option selection.

This makes changes in option type and scope cumbersome to implement, and limits extendibility of a set of source code. Code re-use is also somewhat limited, depending on the structure of the program, i.e. how much is handled by generic functions or subroutines versus how much is written specifically to handle a certain combination of options.

SUMMARY OF THE INVENTION

It is therefore an object of the invention to provide a software architecture for performing stochastic simulations that improves efficiency and cost-effectiveness in the running of stochastic simulations.

It is another object of the invention to provide a software architecture for performing stochastic simulations that provides run-time customization of the architecture and functionality of a simulation system, so that the simulation is customized to the user's particular needs, to improve ease and efficiency of execution.

To achieve these and other objects, there is provided, in accordance with the invention, a system for performing object-oriented stochastic simulations. The system comprises familiar computer components, including a central processing unit (CPU) and a memory store for storing data and program code, coupled to the CPU to facilitate execution of program code stored therein. A user interface is provided, including means for supporting user selection of an option at run time.

A simulator in accordance with the invention is preferably implemented as a single set of source code that can be used to simulate a wide variety of problems. The invention advantageously avoids the need to write specialized programs, by building on user-driven configurability.

In accordance with the invention, the memory store stores the following software components:

(i) a set of simulation objects;

(ii) an object request broker, operable responsive to the user selecting an option, for brokering the selection of one of the simulation objects which corresponds with the selected option, and for configuring an object-oriented stochastic simulator including the corresponding object;

(iii) means for operating the user interface and for executing the object request broker to configure a user-selected object-oriented stochastic simulator; and (iv) means for performing a stochastic simulation using the user-selected object-oriented stochastic simulator.

The invention overcomes the limitations of prior art simulators by taking advantage of the new developments in object-oriented programming techniques to provide a user-configurable architecture. A system according to the invention uses only those combinations of options pre-selected based on the requirements input by the user. At run time, the objects selected by the user are linked, in accordance with their respective natures, to provide a customized simulator.

Object-oriented design is required to implement this invention. Object oriented programming (OOP) is commonly described in computer programming texts and manuals. The invention has been embodied using C++, a particular OOP language. However, any OOP language which includes basic features such as pointers and inheritance can be used. OOP sets up a variety of objects to represent components of a system.

The invention therefore makes the novel and non-obvious combination of stochastic simulation and object-oriented architecture. This combination enables rapid incorporation of complex features, without disturbing features already in the simulation architecture. In particular, the invention makes possible a "universal" chemical simulator.

Through use of pointers, inheritance, containment of objects by other objects, and function overloading, a complete description of a simulation system can be achieved. The invention concerns the way in which the objects are set up. By inheritance, or by allocating pointers which may or may not be used at run time, a limitless variety of features can be planned for in the simulator.

The highly extendable structure, and the resultant simplicity, are noteworthy advantages of the invention. Because of inheritance and dynamic allocation of memory, and by design of self-contained objects to represent various components of the simulation system, it is simple to incorporate new features and options with a minimum of new code. This enables creation of a single simulation package that efficiently handles a wide variety of physical situations, useable for calculations as diverse as starved feed reactors, multi-compartment pharmacokinetics, coupled reaction-diffusion in three-dimensional multi-phase systems, and heat flow, using single reaction volumes or multiply linked compartments. The efficiency is gained by minimizing the amount of memory required to run the program, and by eliminating repetitive and time-consuming progression through decision trees. A simulator according to the invention is also more efficient to program and to maintain, as per the benefits generally conferred by object-oriented implementations.

While the invention is primarily disclosed as a system, it will be understood by a person of ordinary skill in the art that conventional data processors, including a CPU, memory, I/O, program storage, a connecting bus, and other appropriate components, could be programmed or otherwise designed to facilitate the practice of the method of the invention.

The invention may also be practiced as a method, or more specifically as a method for operating a computer system. Such a system would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

A wide variety of processes may be simulated stochastically in accordance with the invention. As conceived and reduced to practice, the invention has particular applicability to stochastic simulation of chemical reactions and transport under the influence of various physical phenomena. In accordance with the invention, objects (that is software objects as per known object-oriented programming theory) are used to represent components of the simulation system. The examples which follow are chosen based on stochastic simulation of chemical processes. However, it will be understood that the invention has similar applicability to any other processes which lend themselves to simulation, stochastic or otherwise, by means of computers.

In the case of simulation of chemical reactions, the objects include particles to represent energy or matter; reaction, mass and energy transfer steps; reaction volumes or subvolumes having diverse characteristics; transfer paths of various types for energy or mass exchange between volumes; regulation of system update processes; time; etc.

System Architecture

Figure 1:
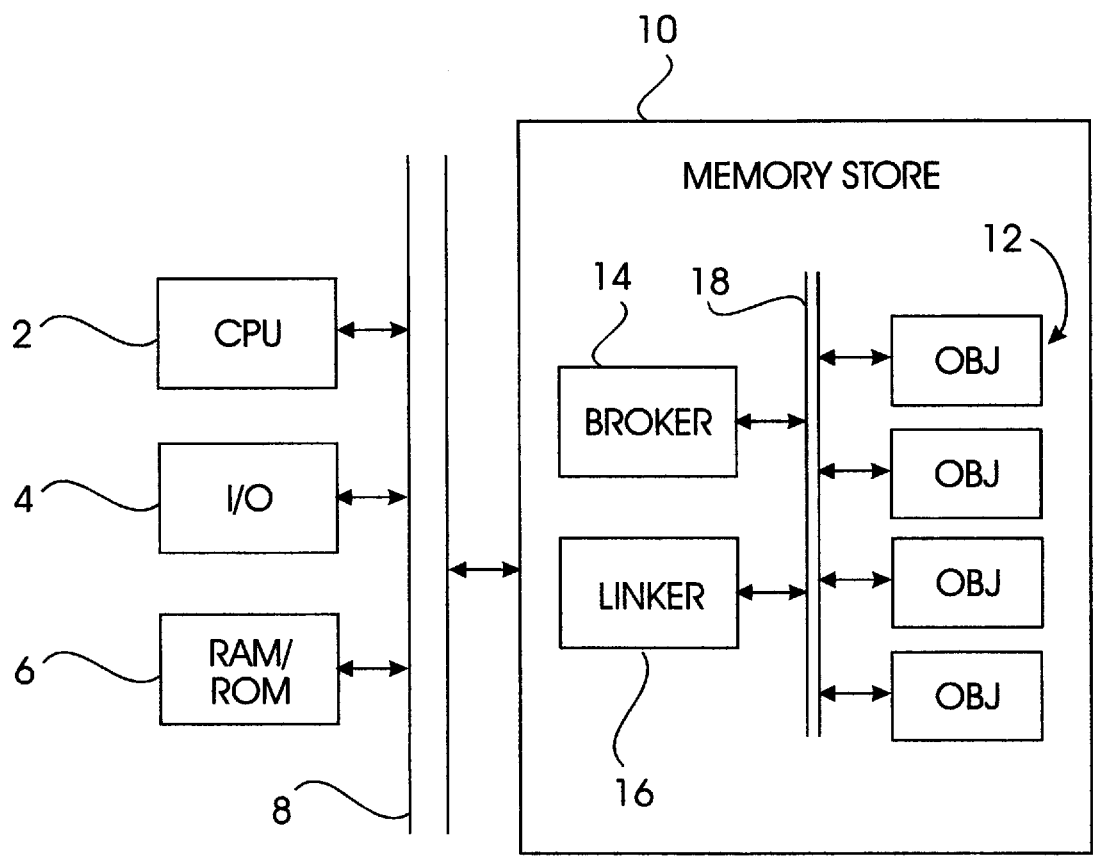
FIG. 1 is a system block diagram of a computer system according to the invention.

Initially, the basic system architecture will be discussed, with reference to FIG. 1. In FIG. 1, there is shown a block diagram which, in many respects, resembles that of a general purpose computer. A central processing unit (CPU) 2, input/output (I/O) 4, which preferably includes a user interface such as a graphical user interface (GUI), and memory 8 including RAM and ROM, are coupled to a system bus 8.

In accordance with the invention, the I/O 4 is used for receiving user commands for setting up and performing a simulation. The interface is preferably object-oriented, as per the overall description of the invention given herein.

The interface may include interactive means for allowing the user to select objects, one by one, and to configure the objects for a desired simulation. Alternatively, it may facilitate batch input of all of the user's simulation requirements, so that the set-up takes place all at once, without further user intervention. In accordance with the invention, the objects are designed to work together cooperatively. As per common practice in object-oriented programming, the objects are designed for direct compatibility with each other, or for compatibility through suitable interfaces.

Preferably, the interface includes both interactive selection and creation of batch files; this is convenient for client/server implementations. Suitable arrangements for inputting the user's requirements will be known to, or foreseeable by, those skilled in the art.

In accordance with the invention, a memory store 10 is provided, containing software components which will be described in detail. First, a set of user-selectable objects is shown generally as 12. The objects 12 are suitable for performing various functions which the system is to perform. Below, an example of objects for chemical simulation is described in detail.

Also provided is an object request broker 14, which processes the user's simulation configuration commands and selects from among the objects 12. The user selects from among the options presented by the user interface, based on the particular simulation requirements. For instance, there may be several different ways of performing a particular aspect of the simulation.

It is an advantageous feature of the invention that the user need not know how the program works, or specifically what software objects exist to implement which of the user-selectable options. Rather, in accordance with the invention the user merely selects the specification or properties required for the simulation. Based on these user selections, the object request broker 14 interprets the user selections, and selects objects suitable for implementation of the simulation in the manner selected by the user.

Also in accordance with the invention, sub-brokers may be provided.

Sub-brokers can be advantageously used where a hierarchy of major objects and subsidiary objects is defined or organized. For instance, a major object, directed to a reaction compartment or vessel might have a subsidiary set of objects defining the shape of the volume in terms of rectangular and polar coordinates, respectively, and the latter subsidiary object might itself have a set of further subsidiary objects directed to compartment shapes in cylindrical and spherical coordinates, respectively.

A sub-broker architecture accommodates such hierarchies of objects by including knowledge, at various levels of specialization, of the objects. In the foregoing example, a user might specify a reaction compartment, whose shape is defined in terms of polar, and then more specifically cylindrical, coordinates. Brokers which handle the increasingly specific user inputs hand off their operation to increasingly specific sub-brokers that correspond with the particular user inputs.

Further in accordance with the invention, some functions of the broker 14 may alternatively be implemented as part of the user interface. For example, where the user initially selects a system vessel geometry in terms of rectangular X-Y-Z coordinates, a GUI which incorporates broker functionality pre-selects general object groups, such as rectangular volume elements and X-, Y-, and Z-oriented transfer paths, which are later subjected to more detailed selection as the user proceeds to specify the desired simulation.

A linker 16 is provided, for implementing links between objects. Skilled object-oriented programmers will recognize that the function of implementing links between objects goes hand-in-hand with that of brokering objects as per commands input through a user interface, and that many implementations of object-oriented software implement a broker and a linker, such as 14 and 16 of the present invention, as a single software module without a distinct dividing line between them. Such implementations are understood to be within the spirit and scope of the invention.

For the present discussion, the linking and brokering functions will be discussed separately. However, the present discussion will be understood to apply to any suitable implementation, including those for which a linker and broker are integrated.

In accordance with the theory of object-oriented programming, each of the objects 12 performs a particular function, and has a particular interface. The particular interface implemented for a given object depends on what the object is required to do. Thus, objects for performing the same aspect in different ways will likely have similar, or subtly different, interfaces. By the same token, if two aspects of a simulation system work together, such as where the results of one are used as the input for the other, their interfaces will likely be compatible.

Responsive to the user commands and the selection of objects by the broker 14, the linker 16 implements the links. Preferably, the linker 16 includes means for checking the compatibility of two objects which are to be linked, for directly linking compatible objects, and for resolving link incompatibilities, such as by providing interfaces between objects, the interfaces being suitable designed to compensate for the incompatibilities. Note that the linker 16 is transparent to the user.

The memory store 10 is shown in schematic block diagram form, for ease of comprehension, in a fashion which illustrates how the broker 14 and the linker 16 accesses the objects 12. This access is suggested by the representation of a bus 18, coupling the objects 12, the broker 14, and the linker 16 together. It will be understood, however, that the memory store 10 need not have any such structure or functionality itself. Rather, the memory store 10 preferably includes indexing or directory means for organizing where, within its address range, the objects 12, the broker 14, and the linker 16 are stored.

In contrast to conventional simulators which use option flags to direct execution via decision trees, a system according to the invention allows the user directly to configure, i.e., to construct, the simulator through choices of options at run-time. The options 12 are presented, via a user interface, as radio buttons or checkboxes which the user activates. The simulator sets itself up to incorporate only those options.

It is a noteworthy aspect of the invention that the programmer (i.e., the author of the software implementation of the invention) only makes the objects available and ensures that they work together. It is the user who actually configures the simulator. This is different from conventional simulation packages, which provide subroutines which the user must call via a simulation program that the user writes.

Figure 2:
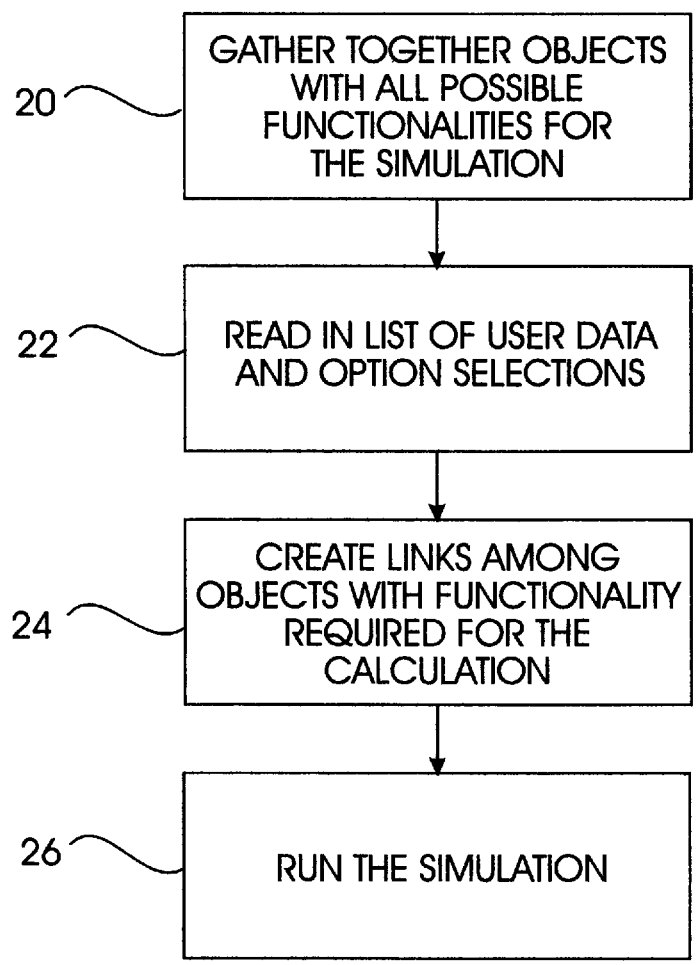
FIGS. 2 and 3 are flowcharts showing functionality according to the invention.

FIG. 2 is a high-level flowchart which summarizes the operation of the system of FIG. 1.

Those skilled in the art of stochastic simulation will be aware that certain basic elements, such as those discussed in the Background, above, will be present in suitable forms. The discussion which follows will refrain from elaborating on these known components, but rather will focus on the customizable objects. Those objects which are customizable, in accordance with the invention, are initially provided as being selectable, for instance being provided as single address pointers. The broker 14 takes user input commands and links appropriate objects, using these pointers.

At or prior to simulation time (i.e., at or prior to run time), a set of objects (the objects 12), which in total provide all of the functionality required for a simulator system, are collected (step 20). The I/O interface 4 is used to obtain user data and options to define the simulation which is desired to be run (step 22). The objects required for that simulation (a subset of the complete set of objects 12) are selected and appropriately linked (step 24). Finally, the simulation itself is run (step 26), using the selected objects, executed according to the principles of object-oriented programming.

Figure 3:
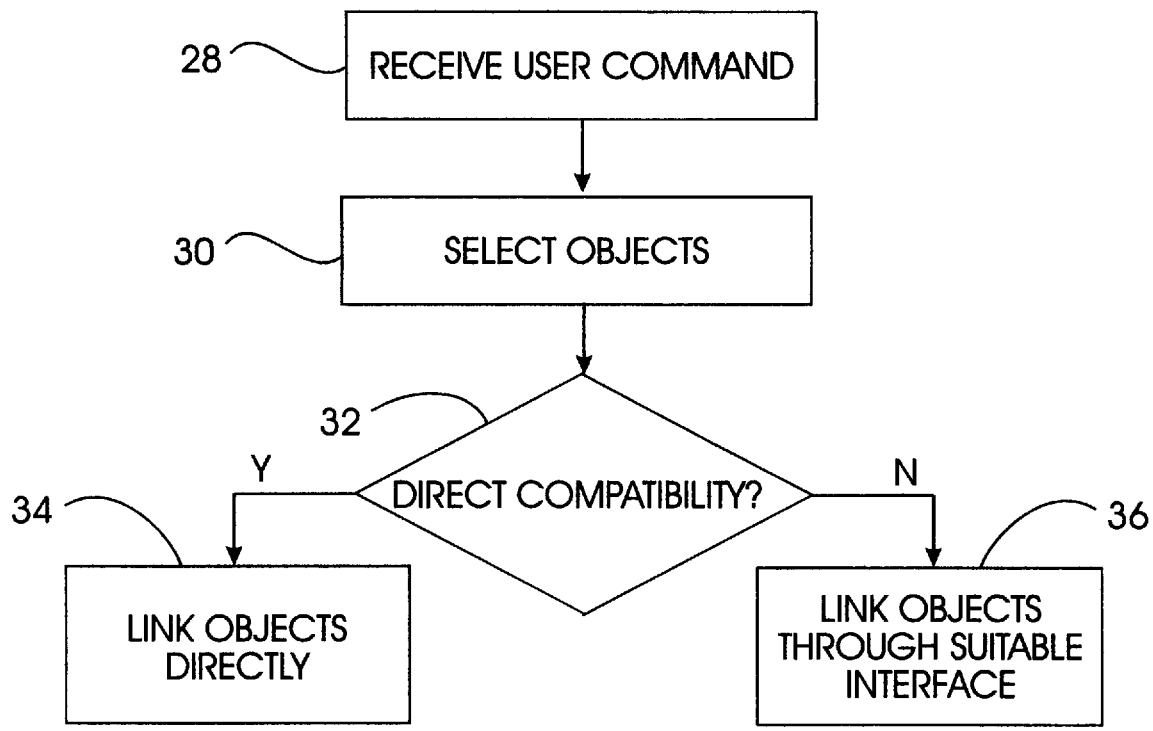

FIG. 3 is a flowchart which summarizes the functionality of a system according to the invention, primarily with reference to the broker 14 and the linker 16 of FIG. 1, and to steps 22 and 24 of FIG. 2. In step 28, a user input is received through the I/O interface 4.

The user input generally includes one or more commands pertaining to the definition and/or the execution of a stochastic simulation. For the purpose of discussion of FIG. 3, it will be assumed that there is a single user command. Multiple user commands are handed likewise.

In accordance with the invention, the command is at a level which conceptualizes the desired simulation. The level need not, and preferably does not, reflect any particular knowledge of the software architecture. The input may include data, such as information pertaining to initial conditions, reactant quantities, time or temperature domains, etc., or it may include a command, such as a "start simulation" command.

The system according to the invention executes the command by, where applicable, selecting or linking objects as per steps 22 and 24. If execution of the input command requires selecting an object, then the broker 14 performs step 30, to select the appropriate object from among the objects 12.

If execution of the input command requires linking two selected objects, then the linking is executed by the linker 16. Preferably, the linker 16 performs a test (step 32) to determine whether the objects to be linked have compatible interfaces. If so (step 34), then the link is implemented directly. If not (step 36), then a suitable interface between the objects is provided.

Figure 4:
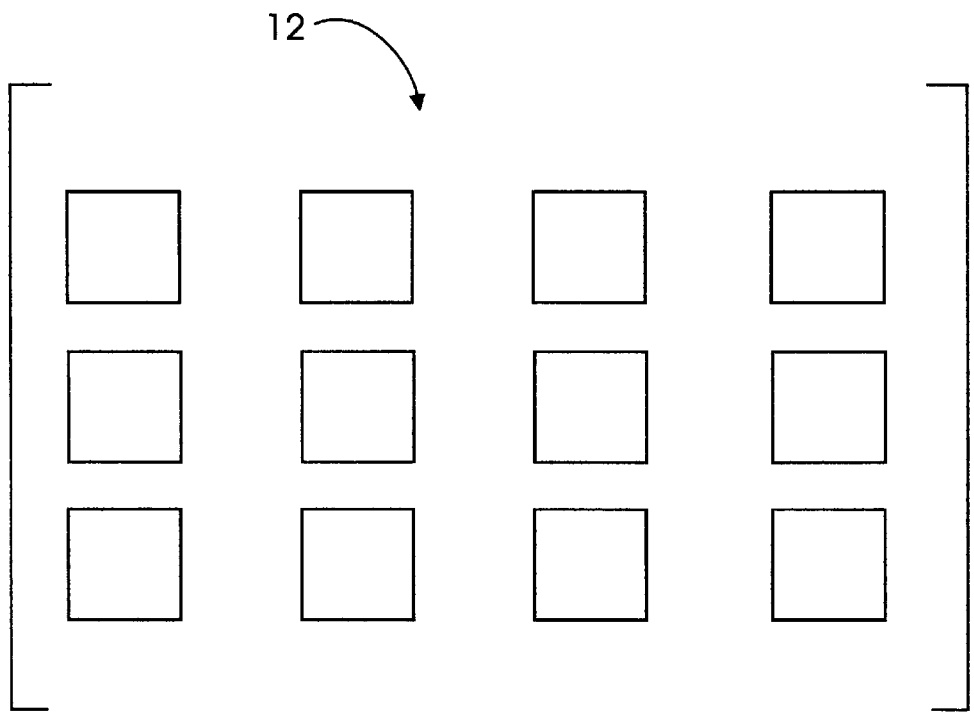
FIG. 4 is a high-level schematic diagram showing a set of objects available for use in accordance with the invention.
Figure 5:
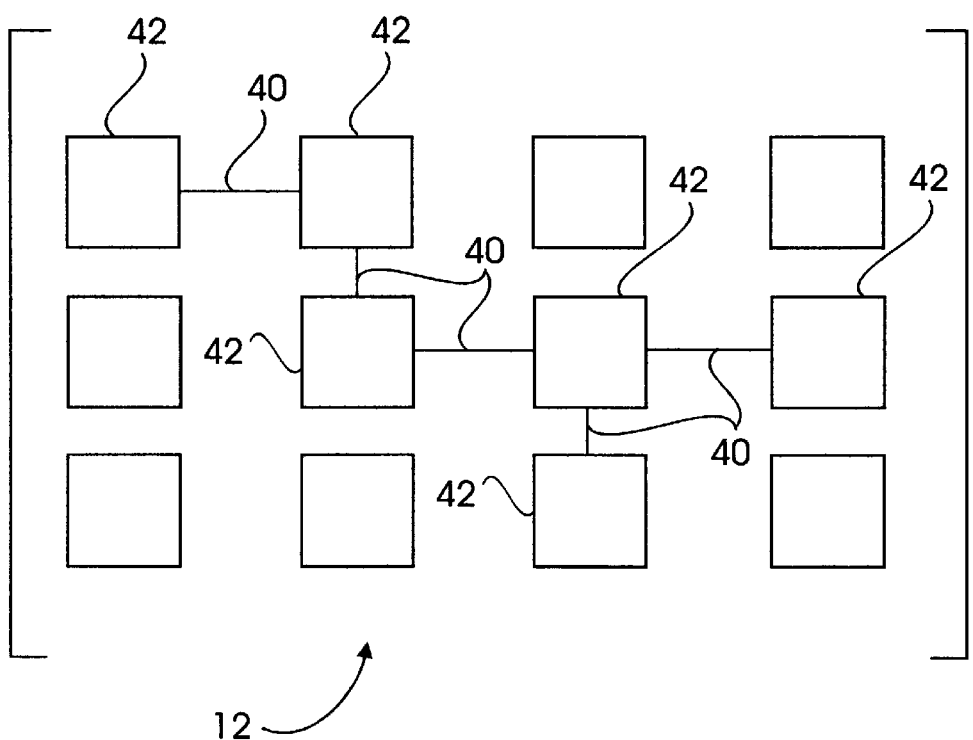
FIG. 5 is a high-level schematic diagram showing the objects of FIG. 4 and links produced by operation of the invention.

FIGS. 4 and 5 are schematic representations of the set of objects 12 of FIG. 1. In FIG. 4, the objects are merely represented as being unconnected and separate. Following operation of step 24 of FIG. 2, links 40 are implemented between the selected objects, which are shown individually as 42. Thus, the selected objects 42 and their links 40, taken together, make up an object-oriented simulator, tailored for the particular needs of the user. When step 26 (run the simulation) is executed, the six selected objects 42 function cooperatively to perform the simulation. The remaining, unselected ones of the objects 12 take no part in the simulation.

While heretofore, objects have been shown merely as undifferentiated boxes, a few concrete examples will be given. For these examples, the overall needs of the simulation system will be discussed, and the distinct functionality of the individual objects will be identified, to show how they fit within the overall system.

Figure 6:
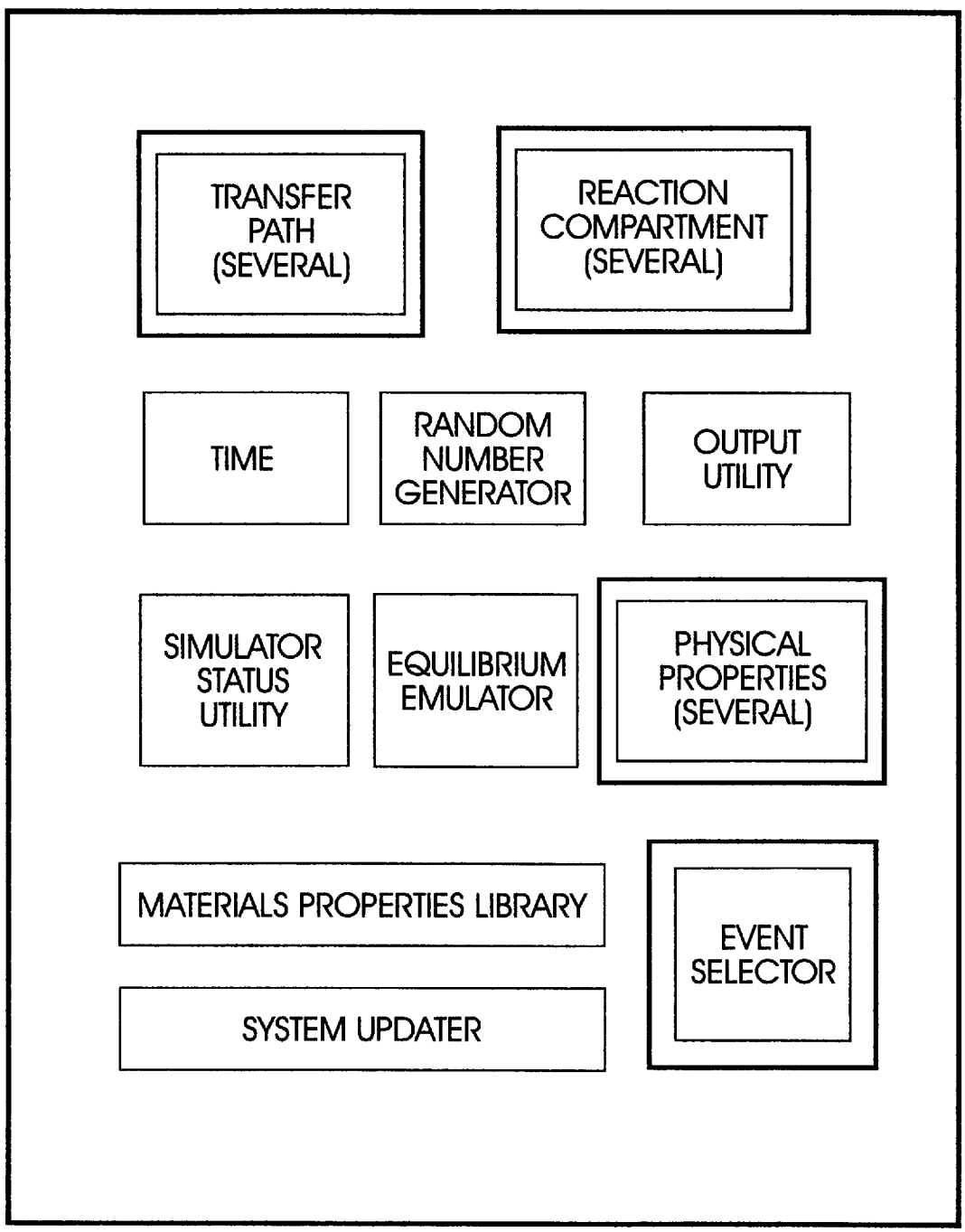
FIG. 6 is a block diagram showing a set of objects, for use in an exemplary system, according to the invention, for performing stochastic simulation.

FIG. 6 is a diagram, similar to that of FIG. 4, showing a set of objects for use with the system according to the invention. The individual objects in FIG. 6 are labeled with their functionalities, which are briefly summarized as follows:

transfer path—defines interface between two compartments that allows transfer of matter, energy, etc, between them.

reaction compartment—location where reactions take place. Can be thought of as a component of a system of vessels, or as a subunit of a three-dimensional array.

time—object to maintain time base.

random number generator—object that furnishes a random number between 0 and 1, on request.

output utility—object to copy system state (e.g., concentrations, temperature, pressure, volume) from memory to storage, from time to time.

simulator status utility—object to track simulation cycle counts.

equilibrium emulator—object which detects equilibrium conditions (which are simulated using different techniques; see, for instance, co-pending, co-assigned U.S. patent application Ser. No. 08/241,316, "Stochastic Simulation Method for Processes Containing Equilibrium Steps"), and which advances the simulation through an equilibrium process.

physical properties—objects which manage energy content and fluid flow in various compartments.

materials properties library—object containing data records for each reactant and product in the system, the data records covering properties such as density, thermal properties, phase, etc.

system updater—object which manages system updating.

event selector—object that manages event selection process.

Figure 7:
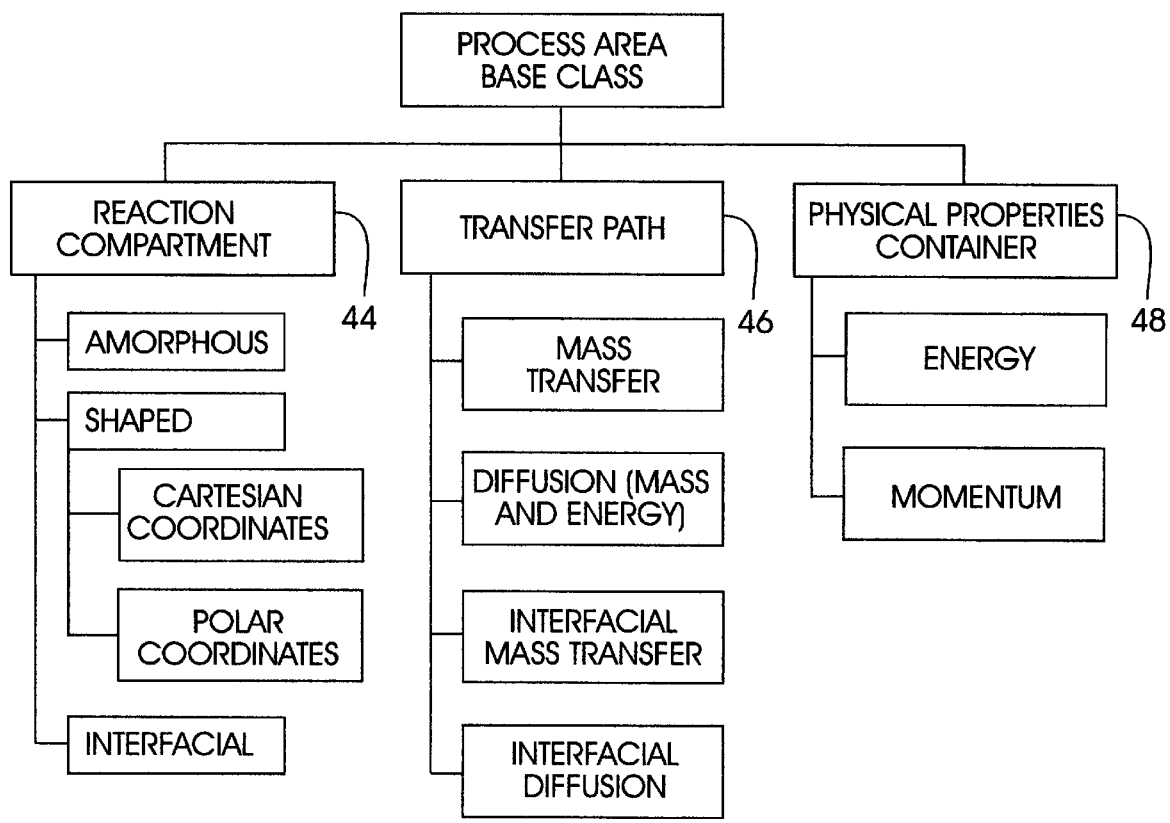
FIG. 7 is a diagram of an exemplary set of objects, showing a class hierarchy arrangement.

In accordance with the invention, objects are classified into class hierarchies. FIG. 7 illustrates the class hierarchy concept for a few of the parameters likely to play a part in a simulator. Specifically, process areas are shown, that can be used to define a spatially distributed simulation system.

A class 44 of objects is shown, relating to the shape of a volume, or compartment, which the simulated chemical process is to take place. As shown by the various objects selectable within the reaction compartment class 44, the compartment can be amorphous in shape, or can be shaped in accordance with Cartesian coordinates (i.e., rectangularly shaped) or with polar coordinates (i.e., circularly shaped). Objects can define volumes (three-dimensionally) or boundary surfaces which interface between adjacent volume elements (two-dimensionally).

A class 46 of transfer path objects is shown, allowing the user to select mass transfer or diffusion.

A class 48 of physical properties allows the user to select energy or momentum, to be explicitly modeled in a reaction-transport system.

The user selects and configures the objects in these classes, to produce a spatially distributed system input. This input is interpreted by the broker 14, and the interpretation is used to link together the required objects from the compartment, transfer path, and properties classes. The resulting mix is no more complex to set up and execute than a uniform set.

In the system according to the invention, an updating object is defined, and contains a pointer to an object of type "updating system". It also contains a method which tells updating system objects to execute their own updating system methods. At run time, user-selected options for temperature, pressure, and volume are examined, and those state variables requiring updating are noted. Memory sufficient for the number of required updating system objects is allocated, accessible through the pointer. The updating method works by stepping through the array of updating system objects in order. Each of the updating system objects is derived from a common base class containing a virtual update method. This enables a uniform method call, even though the actions of each method are specific to the derived class. The result is a very simple, completely customized updating process for each run of the simulator. Updating, in accordance with the invention, replaces a complex decision tree which would be used in a conventional procedural simulator.

This invention can be used to advantage for other features of the simulation: choosing a specific derived class to describe a specific simulation volume, choosing among various types of transport processes depending on the details of the simulation system, and so on. Very little memory is set aside up front to accommodate many kinds of physical situations, and the code is simplified considerably because flags are only examined as data are read in. The end result is faster execution, with only as much memory as necessary allocated at run time.

In accordance with the invention, it is possible to "mix and match" objects from the reaction compartment and transfer path classes. The behavior of each of these objects is known, and the simulator does not differentiate between them. Similarly, the infrastructure for handling objects, such as energy transfer, mass transfer, etc., can be integrated seamlessly. Each object is configured appropriately for what it needs to do, but presents a common face to the simulator.

By working with arrays of objects in this manner, it is straightforward to add features to the simulator in future: the optional task can be simply inserted into the array at the appropriate point for the example of the updated object, or additional derived classes can be made available through linking the appropriate files at compile time.

A read-in and set-up system is used to actually implement this structure of linked objects at run time. These objects look at the data as they are read in, and the system decides which objects to activate. In the system according to the invention, read-in and set-up are implemented as two objects, respectively the broker 14 and the initialization for all objects. Each of these objects is configured for what it needs to do. The set-up only needs to control the sequence.

Figure 8:
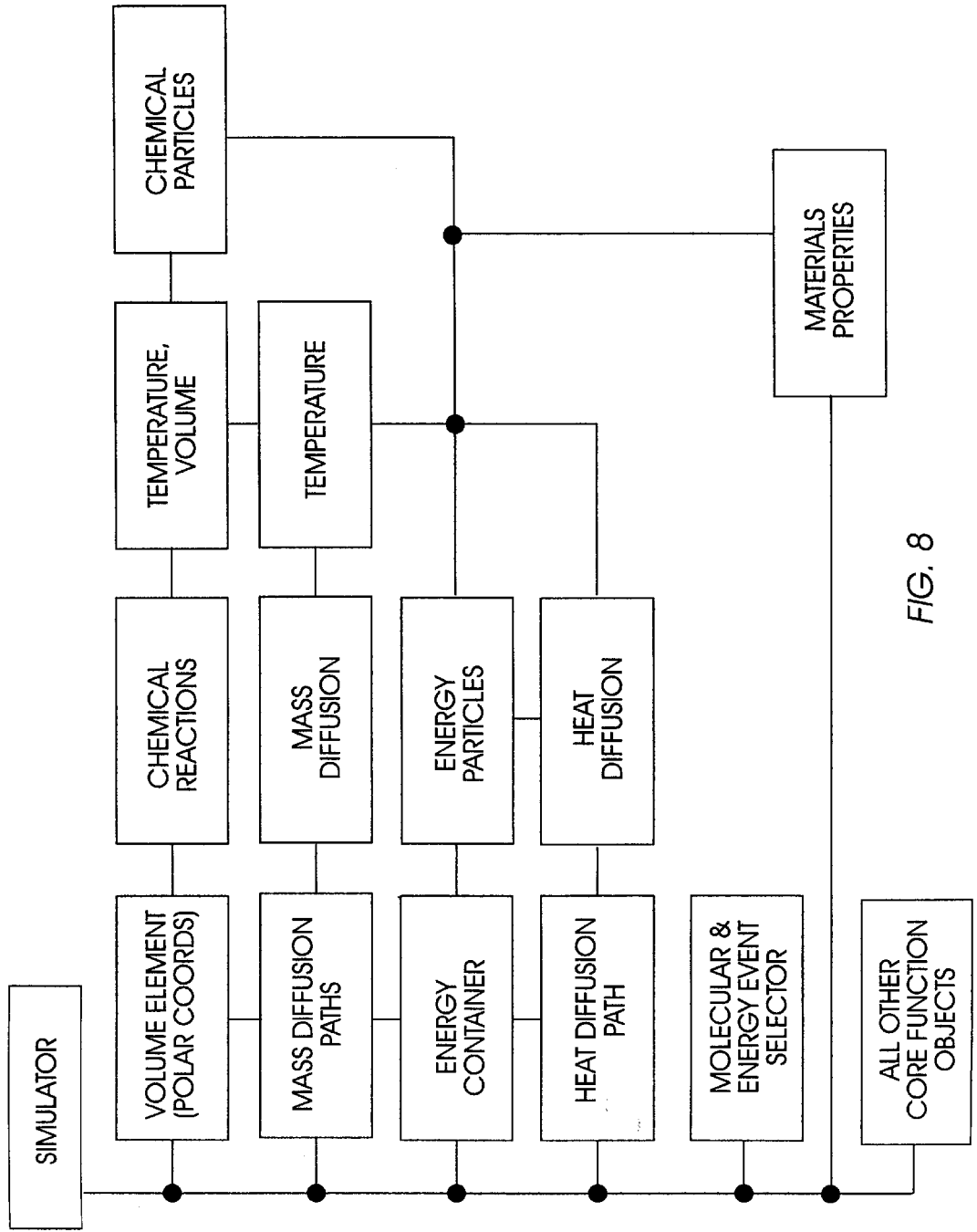
FIG. 8 is a schematic diagram of a first example of the results of operation of a system according to the invention.
Figure 9:
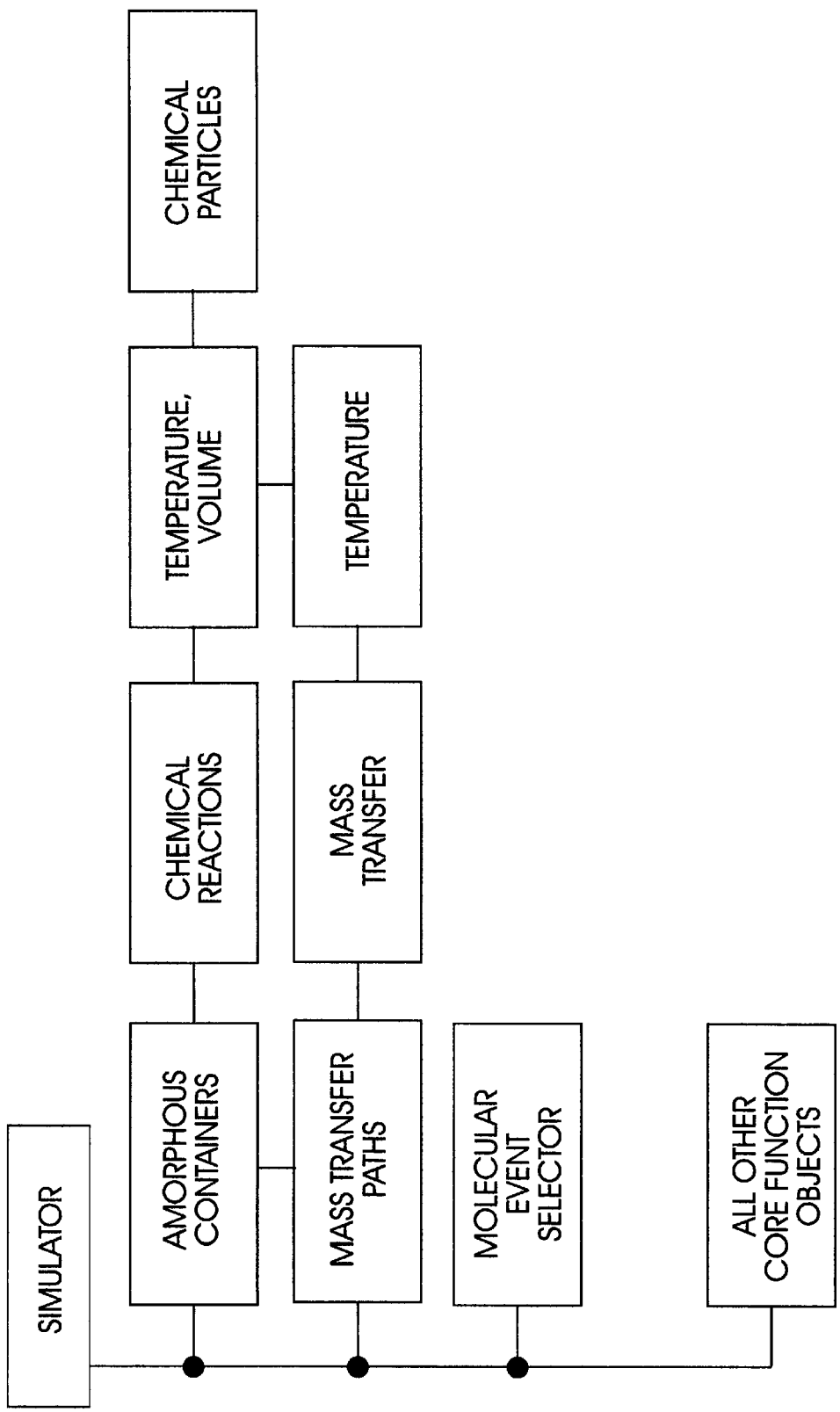
FIG. 9 is a schematic diagram of a second example of the results of operation of a system according to the invention.
Figure 10:
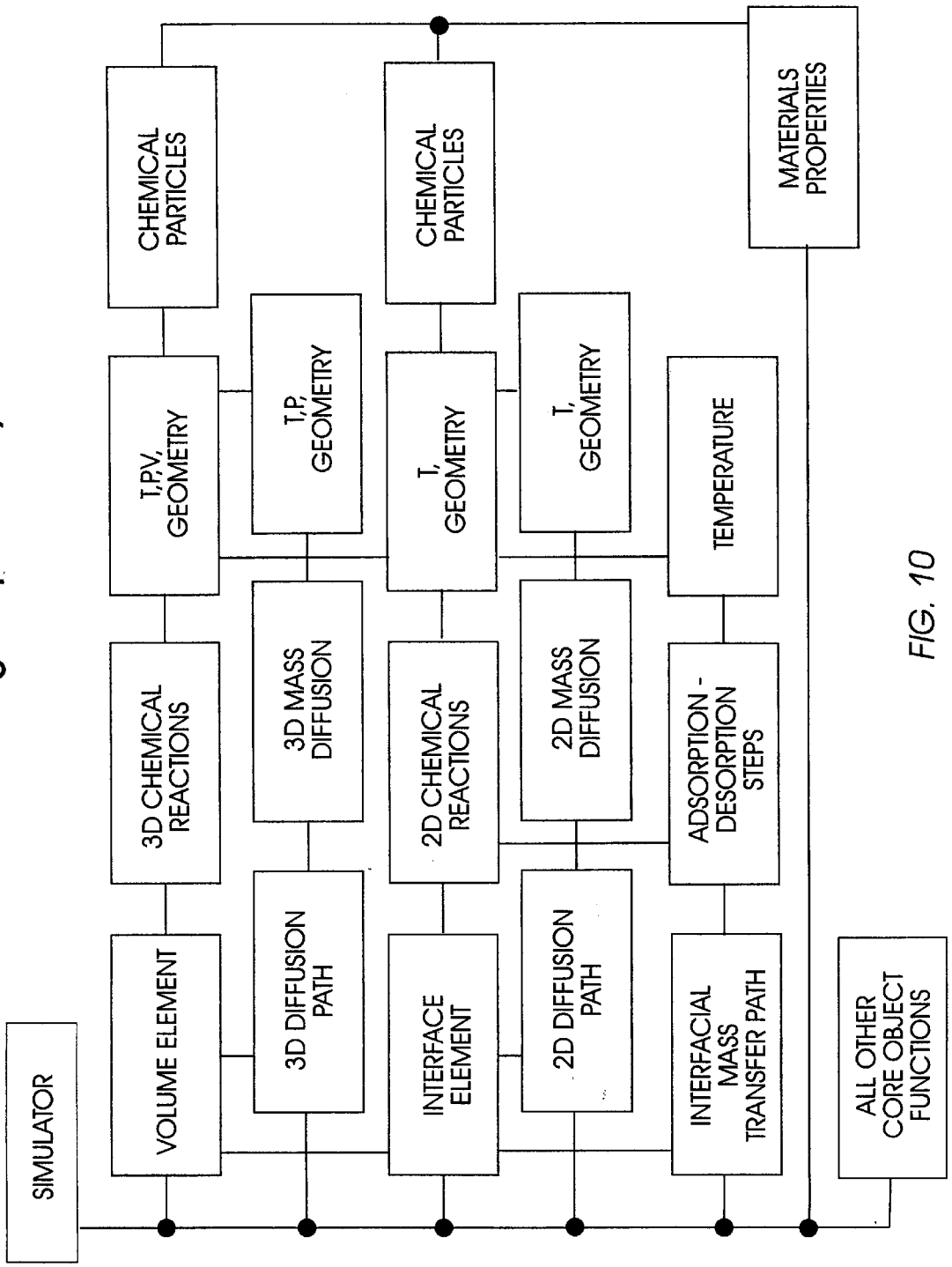
FIG. 10 is a schematic diagram of a third example of the results of operation of a system according to the invention.

Finally, three examples of simulators for three different purposes are shown in FIGS. 8, 9, and 10. Each one has been produced by linking objects appropriate to the respective purposes of the desired simulations, from among the entire set of objects 12. Thus, FIGS. 8, 9, and 10 are understood to be concrete, detailed examples of the linked simulator shown as a generality in FIG. 5.

Note, initially, that for the sake of simplicity, FIGS. 8, 9, and 10 show only a single reaction compartment, a single transfer path, a single reaction step, etc. In a realistic simulation according to the invention, there will likely be several of each. In such a case, a diagram of linked objects, comparable to those of FIGS. 8–10, would show multiple boxes for the duplicate objects.

Again, it is noted that all three of these exemplary configurations are configured at run time from the same code, i.e., from the same set of objects.

FIG. 8: Partially cooled flowing reactor

This is a type of reactor commonly found in chemical manufacturing plants. The reactor vessel has input and output ends, and typically has a cylindrically symmetric geometry. A mixture of reactants enters the reactor at the input end, and the reactants are converted to products as the mixture travels to the other end of the reactor.

In order to keep the reactor under control, means for heat removal, such as a water jacket, is provided. Heat removal is not instantaneous, however, and in order to understand the behavior of this type of reactor it is essential to recognize that there will be a temperature gradient both along the length and the radius of the reactor. Thus, chemistry, mass, and energy transfer must be considered together in the model, since there is a strong interdependence of the three with temperature.

Accordingly, the reaction compartments chosen are in cylindrical coordinates because of the radial symmetry of the system. These compartments contain chemical reaction objects (temperature-dependent kinetics) and chemical particle objects. They are linked to energy container objects, which track the energy content of each compartment via energy particle objects. They are also linked to mass and heat diffusion paths (geometry-dependent) containing mass and heat diffusion step objects.

With this selection of objects, it is possible simultaneously to track chemical reactions that consume and release energy and to convert that energy to a new temperature, depending on the heat capacities of the species present in the compartment. In general it is found that reaction rates will vary somewhat throughout the reactor, and a detailed knowledge of these varying reaction rates is essential to predict and optimize reactor performance. A simulator according to the invention provides advantageously effective means for dealing with these factors.

FIG. 9: Pharmacokinetics

An essential element of drug discovery is characterization of drug metabolism in the human body. For example, if a drug is taken orally, then chemical reactions in, and transfer among, the major organs and the bloodstream as well as drug and by-product excretion, must all be tracked quantitatively. Such systems can be extremely complicated, with widely differing time scales and multiple connections within the body.

To simulate drug metabolism under these conditions, a simulator can be composed of volume element objects of amorphous shapes. That is, the organs in the body need only be characterized by their volume, and not their locations or shapes.

The subset of objects required for this problem is smaller than the reactor case: amorphous containers, chemical reactions and particles, and simple mass transfer paths and processes. Each amorphous container has a characteristic temperature and volume, and can have many transfer path connections to other containers. For example, an amorphous container can represent the blood supply in the body. This container object is connected to other container objects, representing organs, through at least one transfer path, depending on the anatomy of the organ in question. This simulator will properly handle all the various transfer rates, chemical metabolism and concentration changes as blood moves through the body.

FIG. 10: Multi-phase reaction-diffusion

Systems which involve mixtures of gases, solids and liquids undergoing chemical reactions and diffusion between phases requires specialized capabilities for handling interphase kinetics. Within each phase the system can be represented using objects similar to those in FIG. 8 (without the energy container objects). In addition, a new type of compartment object, 2-D interface object, must be used. Its geometry is dependent on the 3-D objects it is connected to.

It has 2 types of transfer paths connected to it, one handling interface (2-D) diffusion, the other handling adsorption and desorption processes which transfer mass from a 3-D volume element to the interface and from the interface to a 3-D volume element. All compartment and transfer path objects including interfacial objects are derived from the same base classes so can be placed interchangeably in the compartment and transfer path arrays. This allows unlimited flexibility in the way the overall system is configured.

Using the foregoing specification, the invention may be implemented using standard programming and/or engineering techniques using computer programming software, firmware, hardware or any combination or subcombination thereof. Any such resulting program(s), having computer readable program code means, may be embodied or provided within one or more computer readable or usable media such as fixed (hard) drives, disk, diskettes, optical disks, magnetic tape, semiconductor memories such as read-only memory (ROM), etc., or any transmitting/receiving medium such as the Internet or other communication network or link, thereby making a computer program product, i.e., an article of manufacture, according to the invention. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention. While the preferred embodiment of the present invention has been illustrated in detail, it should be apparent that modifications and adaptations to that embodiment may occur to one skilled in the art without departing from the spirit or scope of the present invention as set forth in the following claims.

What is claimed is:

1. A computer system for performing object-oriented stochastic simulations, the system comprising:
    a central processing unit (CPU);
    a user interface, which includes means for supporting user selection of a simulation parameter at run time;
    a memory store for storing data and program code, coupled to the CPU to facilitate execution of program code stored therein, the memory store storing:
        (i) a set of simulation objects;
        (ii) an object request broker including means, operable responsive to the user selecting a simulation parameter, for brokering the selection of one of the simulation objects which corresponds with the selected simulation parameter, and for configuring an object-oriented stochastic simulator including the corresponding object;
        (iii) means for operating the user interface and the object request broker until a user-selected object-oriented stochastic simulator has been configured; and
        (iv) means for performing a stochastic simulation using the user-selected object-oriented stochastic simulator.

2. A system as recited in claim 1 wherein, in the contents of the memory store, the set of simulation objects is organized into classes.

3. A system as recited in claim 2, wherein the classes include:
    (i) a class of reaction compartment objects,
    (ii) a class of transfer path objects, and
    (iii) a class of physical properties objects.

4. A system as recited in claim 1 wherein, in the object request broker, the means for configuring includes means for establishing links between appropriate ones of the objects which correspond with selected simulation parameters.

5. A system as recited in claim 1, further comprising a plurality of sub-brokers configured hierarchically beneath the object request broker.

6. A system as recited in claim 5, wherein:
    the user interface includes means for facilitating user selection, in sequence, of a general simulation parameter and of one of several more specific aspects of the general parameter;
    the user selects, in sequence, the general simulation parameter, and then one of the more specific aspects; and
    the system further includes a hierarchy of brokers, the hierarchy including:
        (i) a first broker, which includes means for brokering selection of an object responsive to user selection of the general simulation parameter, and
        (ii) a second, more specific, broker, which includes means for brokering selection of an object responsive to operation of the first broker and to user selection of the one of the more specific aspects.

7. A system as recited in claim 1, wherein, in the object request broker, the means for configuring includes means for linking objects.

8. A system as recited in claim 7, wherein the means for linking includes:
    (i) means for checking compatibility between objects to be linked;
    (ii) means, responsive to a finding of compatibility, for linking the objects directly; and
    (iii) means, responsive to a finding of incompatibility, for linking the objects through a suitable interface.

9. A system as recited in claim 1, wherein the interface includes a graphical user interface.

10. A method for operation of a computer for performing object-oriented stochastic simulations, the computer including:
    a central processing unit (CPU),
    a user interface, which includes means for supporting user selection of a simulation parameter at run time, and
    a memory store for storing data and program code, coupled to the CPU to facilitate execution of program code stored therein,
    the method comprising the steps of:
        (i) maintaining, in the memory store, a set of simulation objects;
        (ii) responsive to the user selecting a simulation parameter, brokering the selection of one of the simulation objects which corresponds with the selected simulation parameter, and configuring an object-oriented stochastic simulator including the corresponding object;

(iii) operating the user interface and the object request broker until a user-selected object-oriented stochastic simulator has been configured; and (iv) performing a stochastic simulation using the user-selected object-oriented stochastic simulator.

11. A method as recited in claim 10 wherein the step of maintaining includes organizing the set of simulation objects into classes.

12. A method as recited in claim 11, wherein the classes include:

(i) a class of reaction compartment objects, (ii) a class of transfer path objects, and (iii) a class of physical properties objects.

13. A method as recited in claim 10 wherein, in the object request broker, the step of configuring includes establishing links between appropriate ones of the objects which correspond with selected simulation parameters.

14. A method as recited in claim 10, further comprising executing sub-brokering steps, the sub-brokering steps being configured hierarchically beneath the step of brokering, for execution responsive to the step of brokering.

15. A method as recited in claim 14, wherein:

the user selects a general simulation parameter and further selects one of a plurality of more specific aspects of the general parameter; and the method further includes:

(i) the step of brokering selection of an object responsive to user selection of the general simulation parameter, and (ii) the step of sub-brokering, which includes brokering selection of an object responsive to execution of the step of brokering and to user selection of the one of the more specific aspects.

16. A method as recited in claim 10, wherein, in the step of brokering, the step of configuring includes the step of linking objects.

17. A method as recited in claim 16, wherein the step of linking includes:

(i) checking compatibility between objects to be linked;

(ii) responsive to a finding of compatibility, linking the objects directly; and (iii) responsive to a finding of incompatibility, linking the objects through a suitable interface.

18. A method as recited in claim 10, wherein the interface includes a graphical user interface.

19. A computer program product, for use with a computer system, for performing object-oriented stochastic simulations, the computer system including:

a central processing unit (CPU); and a user interface, which includes means for supporting user selection of a simulation parameter at run time;

the computer program product comprising:

(i) a computer-readable medium;

(ii) means, recorded on the medium, for directing the computer system to maintain a set of simulation objects;

(iii) an object request broker including means, recorded on the medium, operable responsive to the user selecting a simulation parameter, for directing the computer system to broker the selection of one of the simulation objects which corresponds with the selected simulation parameter, and to configure an object-oriented stochastic simulator including the corresponding object;

(iv) means, recorded on the medium, for directing the computer system to operate the user interface and the object request broker until a user-selected object-oriented stochastic simulator has been configured; and (v) means, recorded on the medium, for directing the computer system to perform a stochastic simulation using the user-selected object-oriented stochastic simulator.

20. A computer program product as recited in claim 19 wherein the means for directing to maintain a set of simulation objects includes means, recorded on the medium, for directing the computer system to maintain the set of simulation objects organized into classes.

21. A computer program product as recited in claim 20, wherein the classes include:

(i) a class of reaction compartment objects, (ii) a class of transfer path objects, and (iii) a class of physical properties objects.

22. A computer program product as recited in claim 19 wherein, in the object request broker, the means for directing to configure includes means, recorded on the medium, for directing the computer system to establish links between appropriate ones of the objects which correspond with selected simulation parameters.

23. A computer program product as recited in claim 19, further comprising means, recorded on the medium, for directing the computer system to execute sub-brokering steps, the sub-brokering steps being configured hierarchically beneath the object request broker, for execution responsive to execution of the object request broker.

24. A computer program product as recited in claim 23, wherein:

the user selects a general simulation parameter and further selects one of a plurality of more specific aspects of the general parameter; and the computer program product further includes a hierarchy of brokers, the hierarchy including:

(i) a first broker, which includes means, recorded on the medium, for directing the computer system to broker selection of an object responsive to user selection of the general simulation parameter, and (ii) a sub-broker, which includes means, recorded on the medium, for directing the computer system to broker selection of an object responsive to execution of the first broker and to user selection of the one of the more specific aspects.

25. A computer program product as recited in claim 19, wherein, in the object request broker, the means for directing to configure includes means, recorded on the medium, for directing the computer system to link objects.

26. A computer program product as recited in claim 25, wherein the means for directing to link includes:

(i) means, recorded on the medium, for directing the computer system to check compatibility between objects to be linked:

(ii) means, recorded on the medium, operable responsive to a finding of compatibility, for directing the computer system to link the objects directly, and (iii) means, recorded on the medium, operable responsive to a finding of incompatibility, for directing the computer system to link the objects through a suitable interface.

27. A computer program product as recited in claim 19, wherein the interface includes a graphical user interface.

* * * * *